United States Patent [19]

Rushford

[11] Patent Number: 5,553,652
[45] Date of Patent: Sep. 10, 1996

[54] TONNEAU COVER SYSTEM

[75] Inventor: Steve Rushford, Granada Hills, Calif.

[73] Assignee: Covercraft Industries, Pauls Valley, Okla.

[21] Appl. No.: 266,223

[22] Filed: Jun. 27, 1994

[51] Int. Cl.[6] .................................................. A47H 23/00
[52] U.S. Cl. ........................ 160/354; 160/368.1; 296/100
[58] Field of Search .............................. 160/327, 368.1, 160/354, 371, 380, 381, 383; 296/100

[56] References Cited

U.S. PATENT DOCUMENTS

| | | | |
|---|---|---|---|
| 2,496,910 | 2/1950 | Fridolph | 160/327 X |
| 3,220,469 | 11/1965 | Oehmig | 160/380 |
| 4,333,284 | 6/1982 | Meadows | 160/368.1 X |
| 4,453,585 | 6/1984 | Ruggeberg, Sr. et al. | 160/368.1 X |
| 4,986,332 | 1/1991 | Lanuza | 160/327 |
| 5,058,652 | 10/1991 | Wheatley et al. | 296/100 X |
| 5,207,262 | 5/1993 | Rushford | 160/354 |
| 5,230,377 | 7/1993 | Berman | 160/327 |

Primary Examiner—Blair Johnson
Attorney, Agent, or Firm—Loeb & Loeb

[57] ABSTRACT

A system for covering an opening in a structure. The system is for use with a structure having sidewalls which surround the opening and extend along the periphery of the opening. The system includes a frame which is mountable on the sidewalls and a cover sheet for covering the opening. The frame of the system has a channel formed therein. The system further includes a single piece flexible fastener, which is secured to the cover sheet, wherein the fastener is received by the channel for securely but detachably retaining the fasteners to the frame.

20 Claims, 3 Drawing Sheets

TONNEAU COVER SYSTEM

BACKGROUND OF THE INVENTION

The present invention relates to tonneau cover systems for providing a weatherproof covering over openings in various structures, including open bed trucks, boats, and stationary outdoor structures.

There being an existing need for such covers, a variety of cover systems are presently on the market and are described in the patent literature. While the systems which are now on the market are all asserted to be rugged, durable and easy to assemble and disassemble, it has been found that they all possess certain drawbacks.

In one type of system which is currently on the market, a cover in the form of a flexible sheet is secured to a frame by means of two part snap fasteners. Each snap fastener is composed of two metal parts including a base which is slidably mounted in a frame section and a snap top or button which is secured to the flexible cover. A system of this type is disclosed in U.S. Pat. Nos. 4,730,866 and 4,838,602 and is embodied in products marketed under the trademark LUXXUS. Since the fastener parts are made of metal, they are subject to corrosion and they are difficult to manipulate under freezing conditions or if they should become soiled. In addition, the snap top or button is fastened to only a relatively small area of the flexible cover, creating the danger of tearing of the cover at the fastening location, particularly when the system is exposed to weather extremes or when abnormal stress is applied to the flexible cover sheet.

Other systems on the market utilize snap fasteners having one component which is fixed in place on the frame, and a second component which is secured in place on the flexible cover sheet.

U.S. Pat. No. 4,496,184 discloses a covering system in which the flexible sheet is secured to a frame by means of continuous connectors which can include VELCRO (tm) materials, adhesive tapes, oppositely polarized magnets, or a combination of magnets and steel plates. VELCRO (tm), or hook-and-loop fasteners, are known to have a limited useful life, after which the hook portions will have degraded the loop portions to a service level that is no longer acceptable. Adhesive tapes have an even more limited useful life, while commercially acceptable magnet systems cannot produce high holding force levels.

U.S. Pat. No. 4,639,033 discloses a system in which a flexible sheet is attached to a frame by means of extruded plastic fasteners. Such fasteners are difficult to work with under hot or cold weather conditions which cause the flexible sheet material to expand or contract. Particularly if the flexible sheet experiences a certain degree of expansion, the extruded fastener will no longer have a positive attachment to the frame.

Applicant is also aware of a prior proposal to connect a flexible cover to a frame by a snap fastener arrangement having a fastener base which is clipped to the frame in a manner such that the base can be easily removed. Attachment of the base to the frame requires a spring metal member which is subject to corrosion. Moreover, since the base part can be easily removed from the frame, there is a high likelihood of such base parts being lost, particularly when the flexible cover is not in place.

U.S. Pat. No. 5,207,262 discloses a system which obviates or minimizes the drawbacks discussed above. In this system a plurality of button members are retained by a frame so as to be movable in the direction of the periphery of the opening to be covered and to be inseparable from the frame. These button members are connectable to a plurality of receptacle members which are secured to a covering sheet and receive the buttons of the button members. Such a system requires aligning the button members with the receptacle members each time the covering sheet is attached. This can be time consuming and particularly difficult in certain situations, such as in the nighttime.

SUMMARY OF THE INVENTION

It is an object of the present invention to provide an improved cover system.

A more specific object of the invention is to provide a system having connectors whose parts are securely attached to the flexible sheet and frame, respectively.

A further object of the invention is to provide connector parts which can be made of plastic, thereby eliminating corrosion problems.

A further object of the invention is to provide a system having connector parts which can be easily connected or disconnected and which will remain connected together with a high degree of reliability.

A further object of the invention is to provide a system having a simplified fastener, including a minimal number of parts.

Still another object of the invention is to provide a system in which the connector parts secured to the flexible sheet are secured in a manner which enables the sheet to sustain high force loads without the risk of tearing.

The above and other objects are achieved, according to the present invention by a system for covering an opening in a structure, the opening having a periphery, the structure having sidewalls surrounding the opening and extending along the periphery of the opening, and the system including means defining a frame mountable on the sidewall so as to surround the opening, a flexible sheet for covering the opening, and connecting means for securing the sheet to the frame, the improvement wherein said connecting means comprise a plurality of fasteners secured to said sheet and which engage and lock into a channel formed in said frame for securely but detachably retaining said fasteners to said frame.

DESCRIPTION OF THE PREFERRED EMBODIMENTS

Figure 1:
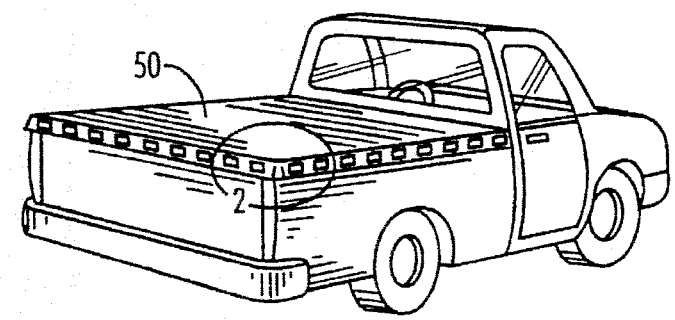
FIG. 1 is a perspective view illustrating a preferred embodiment of the present invention, employed for example on a vehicle.
Figure 3:
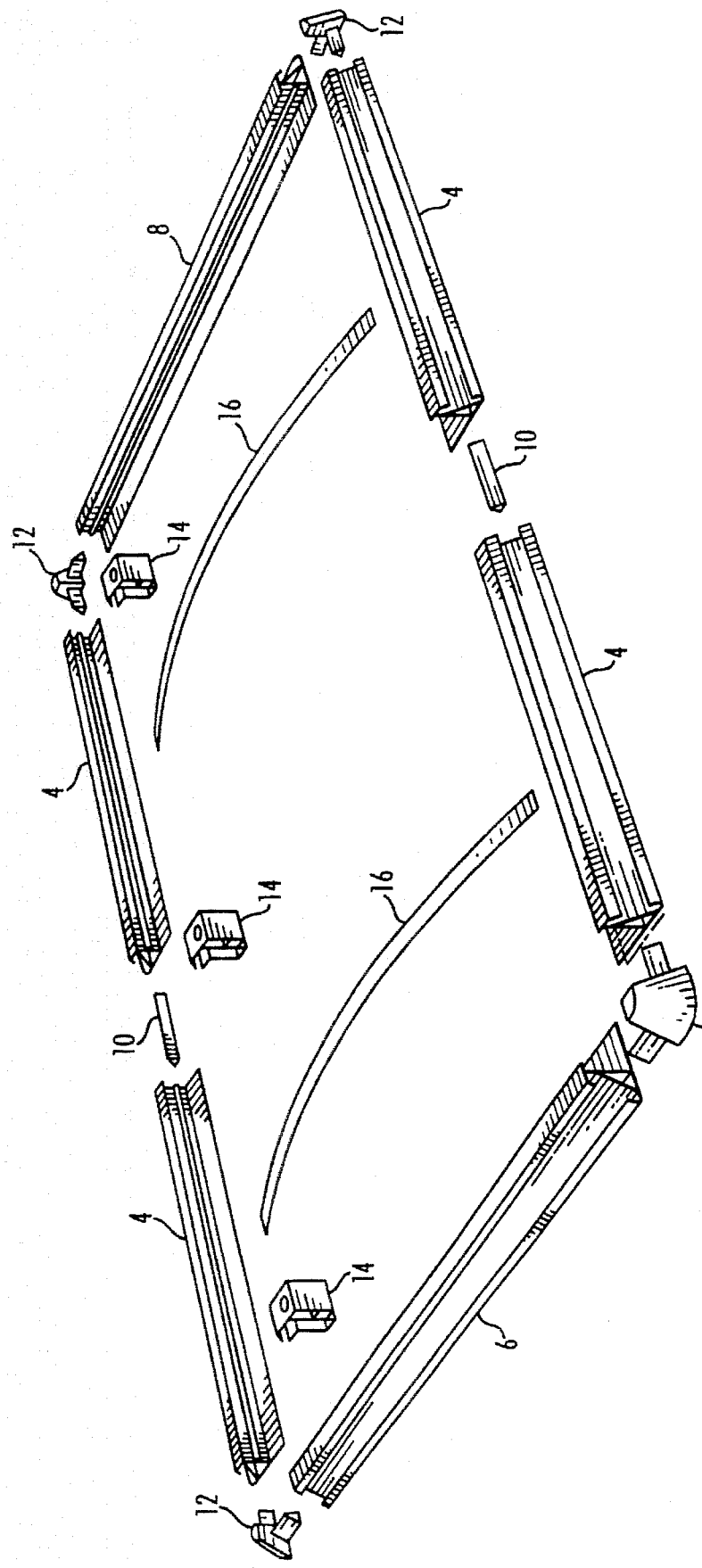
FIG. 3 is a perspective view illustrating the basic components of a system, in a disassembled state, to which the invention may be applied.

FIG. 3 illustrates the basic components of a rail system which will be employed, in accordance with the present invention, in combination with a flexible sheet of material to form a tonneau cover for an opening. The principal use contemplated for a system according to the present invention is as a cover for an open truck bed, as illustrated in FIG. 1. However, one can imagine other advantageous uses for covering openings of stationary structures, open boat areas, etc. and it is expected that those purchasing such a system may utilize it in a wide variety of imaginative ways.

The contemplated system includes, firstly, a frame which may have the form shown in FIG. 3 and is composed of a plurality of side rails 4, a front rail 6 and a rear rail 8. Each side of the frame system may be defined by one or more side rails 4 and when more than one side rail 4 is disposed along each side of the frame, they may be joined together by suitable rail couplers 10 which will engage rails 4 in a manner to be described below.

Similarly, although it is the usual practice for each of the front and rear rails to be made in one piece, each of these rails could also be made in more than one piece, with the pieces being connected together by a suitable coupler 10. In addition, one or both of front rail 6 and rear rail 8 could be replaced by a simple stiffening element to which the flexible sheet would not be attached. For example, in the case of a system for covering a truck bed, it may not be practical to secure the flexible cover to the front rail.

In each corner of the frame, front rail 6 and rear rail 8 will be connected to adjacent side rails 4 by suitable corner couplers 12 which will be assembled to rails 4, 6 and 8 in a manner that will be described below.

A cover system according to the invention is intended to cover an opening in a structure and the above-described frame is preferably secured to the sidewalls of such opening by suitable clamps 14 which may have any known configuration. The illustrated configuration of clamps 14 enables them to clamp rails 4, 6 and 8 to a horizontal surface 48 of a structure which is open toward the interior of the opening to be covered, as will be described in further detail below. If rails 4, 6 and 8 are to be secured to other sidewall arrangements, such as vertical panels, other known clamp elements can be employed. In any event, rails 4, 6 and 8 could always be fastened to sidewalls of the structure to be covered by bolting or by means of sheet metal screws or other suitable fasteners. Rails 4, 6, and 8 may further include a foam tape 60 affixed to a base piece 22 of rail 4, 6, and 8, as illustrated in FIGS. 5 and 6.

Figure 2:
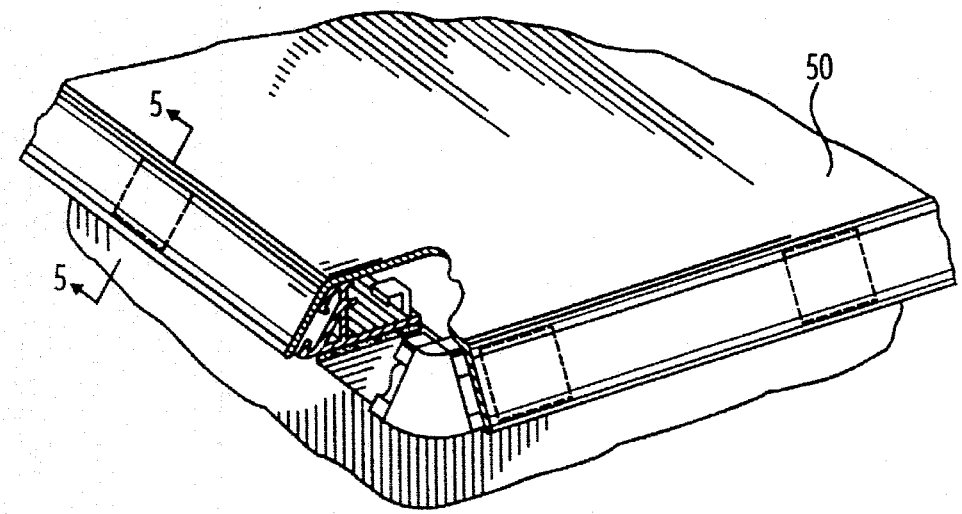
FIG. 2 is a detail perspective view of FIG. 1, including a cut-a-way portion.

The structure illustrated in FIG. 3 may be completed by arcuate stays 16, known in the industry as support bows or tonneau bows. As illustrated in FIGS. 1 and 2, the stays 16 will give a roof-like form to a flexible cover sheet 50 provided to cover the opening. Stays 16 are installed in such a manner as to be readily removable when they are not desired.

Figure 5:
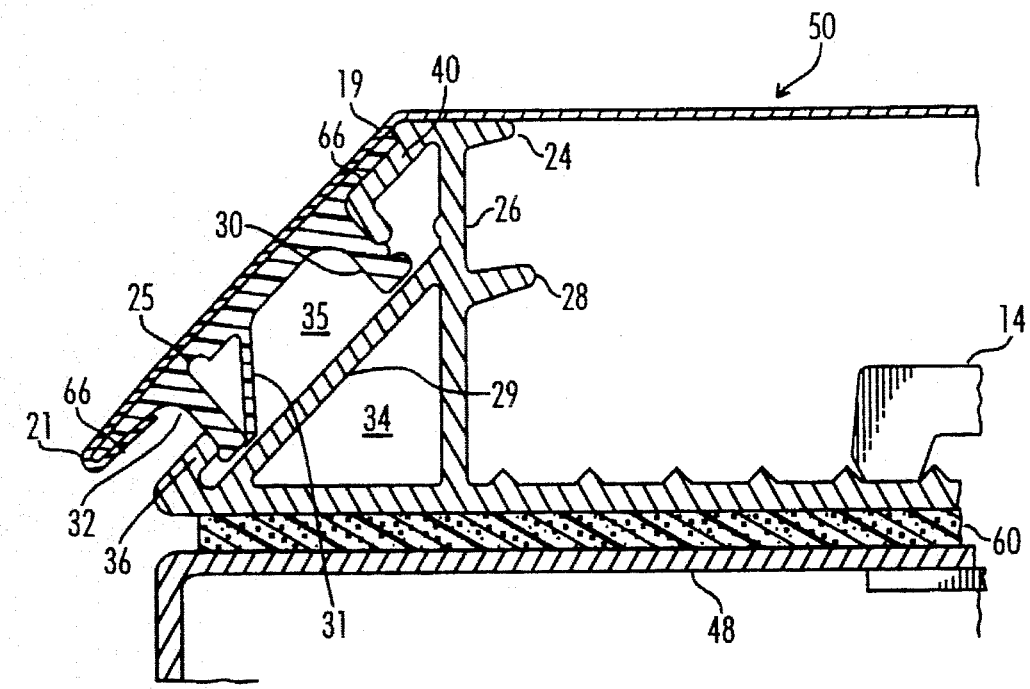
FIG. 5 is a cross-sectional view along the line 5—5 of FIG. 2, and with the fastener of FIG. 4a in an engaged state.
Figure 6:
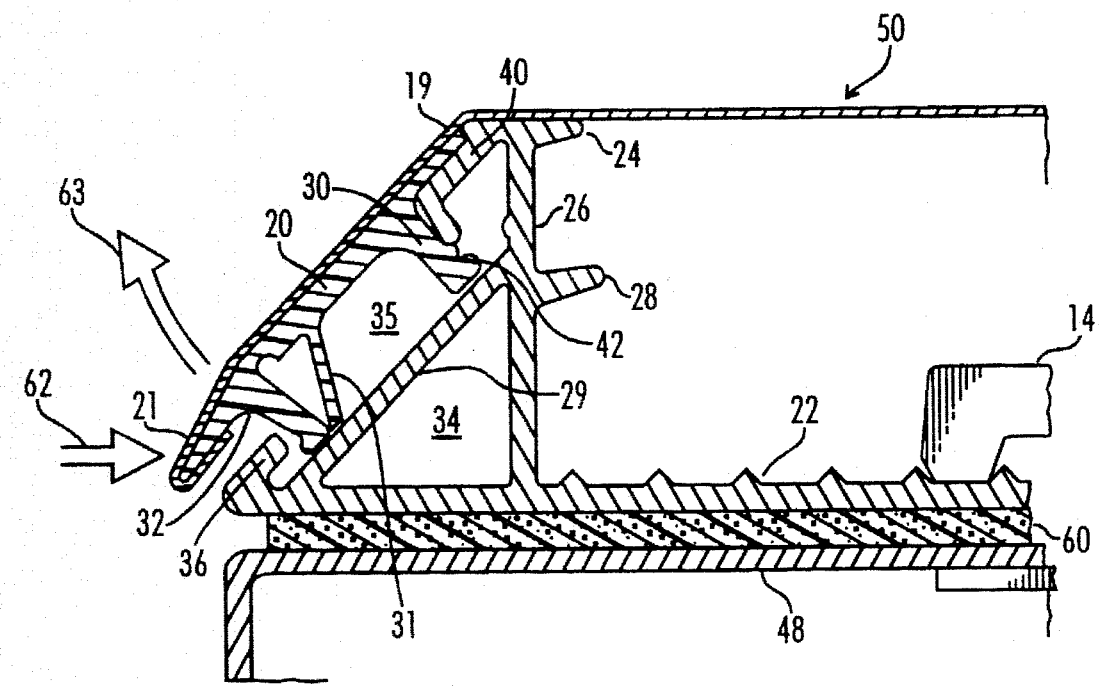
FIG. 6 is a cross-sectional view along the line 5—5 of FIG. 2, and with the fastener of FIG. 4a in a disengaging state.

One suitable embodiment of each rail 4, 6, 8 is shown in cross section in FIGS. 5 and 6. The illustrated embodiment includes a horizontal base piece 22, a top flange 24 and a vertical web 26 extending between base piece 22 and top flange 24. Web 26 carries an inclined projection 28. One end of a stay 16 is to be held in place between projection 28 and base piece 22. Normally, the base piece 22 of front and rear rails 6 and 8 can be made substantially narrower than is illustrated in FIGS. 5 and 6, or may be eliminated entirely. In addition, rails 6 and 8 need not be provided with a projection 28. Affixed to the bottom of base piece 22 is foam tape 60. The tape 60 acts to cushion the frame and will prevent the vehicle sidewalls from becoming scratched or marked. Further, the tape acts as a moisture barrier and a weather stripping seal between the frame system and the sidewalls. In a preferred embodiment, the tape is polyethylene with an adhesive backing.

Each rail 4, 6, 8 further includes an inclined web 29 which cooperates with portions of web 26 and base piece 22 to form a triangular passage 34. Each end of passage 34 can receive one end of a coupler 10 or 12.

One end of base piece 22 is folded up to form a retaining lip 36 and top flange 24 carries a projecting member 40 having a free end which faces toward web 29. Web 29, lip 36 and projecting member 40 cooperate to form a channel 35 for retaining one or more fasteners 18.

Figure 4A:
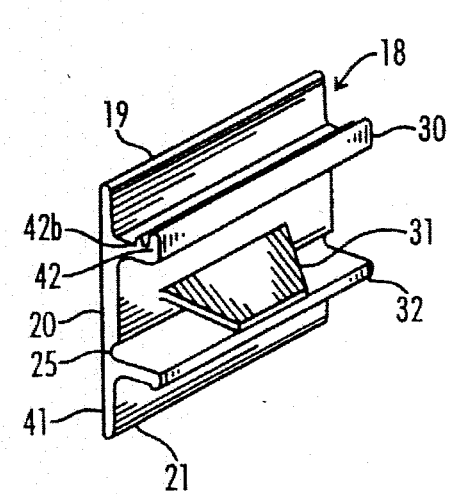
FIG. 4a is perspective view of a first embodiment of a fastener of the present invention.
Figure 4B:
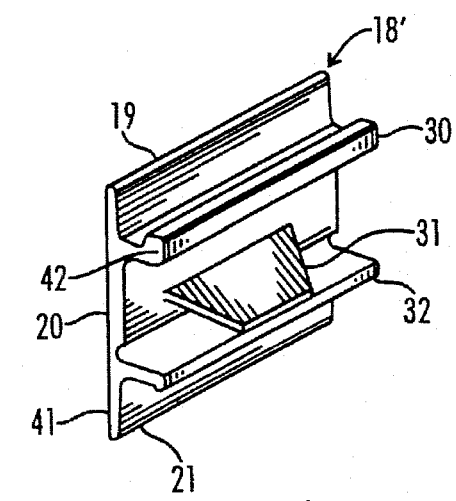
FIG. 4b is a perspective view of a second embodiment of a fastener of the present invention.

Preferred embodiments of the fasteners are shown in FIGS. 4a and 4b and in cooperation with the frame in FIGS. 5 and 6. The fasteners 18 and 18' have a first substantially flat base portion 20. Extending from base portion 20 are a first leg 32 and a second leg 30. First leg 32 has an outwardly projecting lip 41 formed on a terminal end. Second leg 30 has an outwardly projecting lip 42 formed on a terminal end as illustrated in FIG. 4b. Second leg 30 may also have a second outwardly projecting lip 42b as is illustrated in FIG. 4a. Second lip 42b is shorter than lip 42. Fastener 18 also has a locking leg 31 extending from base portion 20 and inclined towards first leg 32.

When the system according to the present invention is to be assembled on a horizontal wall 48 of a structure presenting an opening to be covered, base pieces 22 of at least rails 4 will be clamped to wall 48 by means of clamps 14. The opening will then be covered by a flexible sheet 50 of plastic, canvas, or other durable material constituting a tonneau cover, or tarp, cover sheet 50 being secured to fasteners 18 in a manner to be described below.

The periphery of cover sheet 50 carries a plurality of fasteners 18 or 18' each permanently secured to cover sheet 50, as by stitching, stapling, pinning, etc. One such fastener 18 is shown alone in FIGS. 4a and 4b. Also shown in greater detail is a fastener 18, 18' connected to a cover sheet 50 and engaged with rail 4 in FIGS. 5 and 6. Each fastener 18, 18' is preferably made of a plastic material, such as a black acetal plastic, a material which is not subject to corrosion or other forms of deterioration and which can be penetrated in order to be secured to cover sheet 50 in one of the ways mentioned above.

Turning to FIGS. 5 and 6, it may be seen that one embodiment of a fastener 18 according to the invention includes flat, elongated upper and lower connecting flanges 19 and 21 via which fastener 18 can be attached to cover sheet 50 as by stitching 66. Flanges 19 and 21 permit the transmission of stresses between cover sheet 50 and each fastener 18 to be distributed over a relatively large area of cover sheet 50.

As is illustrated in FIGS. 4–6, fastener 18 further includes a hinge section 25 located above first leg 32, hinge section 25 being formed by providing a radial cutout in base portion 20. Hinge section 25 allows first leg 32 to flex and then engage channel 35 formed by web 30, retaining lip 36 and projecting member 40.

Referencing FIG. 5, attachment of fastener 18 to rail 4 will now be described. To bring a fastener 18 into engagement with the channel 35, sheet 50 must be stretched over the top of flange 24. Upper connecting flanges 19 is placed in line with the top of projecting member 40. Second leg 30 is pressed against projecting member 40 as fastener 18 is lowered into channel 35. A downward force is then applied to lower connecting strip 21. As the force is applied, lip 42 and lip 42b engage projecting member 40 and first leg 32 folds in and slips over retaining lip 36. As first leg 32 folds in, it engages locking leg 31. When the applied force is removed from lower connecting flanges 21, locking leg 31 pushes first leg 32 downward and presses lower leg 32 into engagement with retaining lip 36 such that fastener 18 is securely retained in channel 35. When fastener 18 is placed into channel 35, locking leg 31 acts to prevent lower leg 32 and therein fastener 18 from accidentally disengaging from channel 35.

Referencing FIG. 6, removal of fastener 18 from rail 4 will now be described. In order to release fastener 18 from channel 35, one simply applies pressure horizontally to lower connecting flange 21, towards the center of the covered opening and in the direction of arrow 62, then lifts lower connecting flange 21 upward in the direction of arrow 63. As pressure is applied in the horizontal direction, first leg 32 engages locking leg 31 and is lifted upwards away from web 29. This movement allows first leg 32 and lip 41 to be lifted over retaining lip 36 when an upward force is applied to lower connecting flange 1 in the direction of arrow 63.

The fastening arrangement according to the present invention will successfully resist forces imposed on cover sheet 50 in virtually any other direction.

Since all fasteners 18 are arranged to face inwardly relative to the covered opening and are inclined relative to the vertical, and cover sheet 50 is stretched over top flange 24, cover sheet 50 can be placed under tension and a neat connecting arrangement achieved, even if stays 16 are not provided.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. In a system for covering an opening in a structure, the opening having a periphery, the structure having sidewalls surrounding the opening and extending along the periphery of the opening, and the system including means defining a frame mountable on the sidewall so as to surround the opening, a flexible sheet having a plurality of sides for covering the opening, and connecting means for securing the sheet to the frame, the improvement wherein said connecting means comprises:

an elongated channel formed in said frame; and a plurality of flexible fasteners on each of the plurality of sides of the sheet, each having a base portion and being permanently secured to the sheet by the base portion, which are received by said elongated channel for securely but detachably retaining each of said plurality of fasteners to said frame anywhere along said elongated channel in said frame so that the plurality of fasteners are adjustable in the elongated channel of the frame.

2. A system as defined in claim 1, wherein each of said plurality of fasteners includes a substantially flat base portion, a first leg and a second leg extending from said base portion, said first leg and said second leg being operably engageable with said channel.

3. A system as defined in claim 2, wherein the channel has an upper and a lower retaining member said first leg and said second leg of each of said plurality of fasteners each having at least one lip formed on a terminal end of a respective one of said legs to operably engage a respective one of said upper and said lower retaining members of said channel.

4. A system as defined in claim 3, wherein each of said plurality of fasteners further includes a third leg, extending from said base portion and inclined towards said first leg.

5. A system as defined in claim 1, wherein the flexible sheet is connected to the frame solely by the plurality of fasteners.

6. A system as defined in claim 1, wherein the flexible sheet is secured free of contact with the channel formed in the frame.

7. A system as defined in claim 1, wherein the plurality of fasteners include a plurality of gripping members formed on the base portion for detachably engaging the channel, and wherein the flexible sheet is permanently coupled to the base potion on a side opposite the plurality of gripping members.

8. A system as defined in claim 1, wherein the system is for use on a moving vehicle.

9. A fastening system for securing a flexible sheet to a rail having a channel formed therein, the system comprising:

a rail comprising a horizontal base piece, a top flange, a vertical web extending between the base piece and the flange, and an inclined web wherein the inclined web cooperates with the vertical web and base piece to form a triangular passage;

said base piece having an end wherein the end is folded up to form a retaining lip;

said top flange having a projecting member wherein said projecting member includes a free end which faces toward said inclined web;

said inclined web, retaining lip and projecting member cooperating to form a channel;

a flexible sheet;

a plurality of flexible fasteners, connected to said sheet, each fastener comprising a base portion, a first and a second leg extending substantially perpendicularly from said base portion for engaging said channel, and a third leg extending from said base portion, inclined towards and engagable with said first leg, each of said first and second legs having a lip on a terminal end which cooperates with said retaining lip and said projecting member to retain said fastener in said channel.

10. A fastening system as defined in claim 9, wherein said base portion has upper and lower flanges for connecting said sheet to said base portion for distributing stresses between the sheet and each of said plurality of fasteners.

11. A system for covering an opening in a structure, the opening having a periphery, the structure having sidewalls surrounding the opening and extending along the periphery of the opening, the system comprising:

a frame mountable on the sidewall so as to surround the opening, the frame shaped to form an elongated channel in the frame;

a flexible sheet having a plurality of sides for covering the opening; and a plurality of flexible fasteners on each of the plurality of sides of the sheet, each having a base portion and being permanently secured to the sheet by the base portion, which are received by the elongated channel for securely but detachably retaining each of the plurality of fasteners to the frame anywhere along the elongated channel in the frame such that the plurality of fasteners are adjustable in the elongated channel of the frame and the flexible sheet is detachably secured to the frame through the permanent connection between the flexible sheet and the plurality of fasteners.

12. A system as defined in claim 11, wherein the system is for use on a moving vehicle.

13. A system as defined in claim 11, wherein each of the plurality of fasteners include the base portion, which is substantially flat, a first leg and a second leg extending from the base portion, the first leg and the second leg being operably engageable with the channel.

14. A system as defined in claim 13, wherein the channel has an upper and a lower retaining member, the first leg and the second leg of each of the plurality of fasteners each having at least one lip formed on a terminal end of a respective one of the legs to operably engage a respective one of the upper and the lower retaining members of the channel.

15. A system as defined in claim 14, wherein each of the plurality of fasteners further includes a third leg, extending from the base portion and inclined towards the first leg.

16. A system as defined in claim 11, wherein the flexible sheet is connected to the frame solely by the plurality of fasteners.

17. A system as defined in claim 16, wherein the flexible sheet is secured free of contact with the channel formed in the frame.

18. A system as defined in claim 11, wherein the plurality of fasteners include a plurality of gripping members formed on the base portion for detachably engaging the channel, and wherein the flexible sheet is permanently coupled to the base potion on a side opposite the plurality of gripping members.

19. A system for covering an opening in a structure, the opening having a periphery, the structure having sidewalls surrounding the opening and extending along the periphery of the opening, the system comprising:

a frame mountable on the sidewall so as to surround the opening, the frame shaped to form an elongated channel in the frame, wherein the channel defines a elongated channel length;

a flexible sheet having a plurality of sides for covering the opening; and a plurality of flexible fastener on each of the plurality of sides of the sheet, each having a base portion that has a length substantially less than the channel length, and each of the plurality of fasteners being permanently secured to the sheet, the plurality of fasteners being received by the elongated channel for securely but detachably retaining each of the plurality of fasteners to the frame anywhere along the elongated channel so that the plurality of fasteners are adjustable in the elongated channel of the frame.

20. A system as defined in claim 19, wherein the plurality of fasteners include a plurality of gripping members formed on the base portion for detachably engaging the channel, and wherein the flexible sheet is coupled to the base potion on a side opposite the plurality of gripping members.

* * * * *